No. 703,950. Patented July 1, 1902.
J. W. McCLURE.
BUSH CHISEL.
(Application filed Sept. 10, 1901.)
(No Model.)
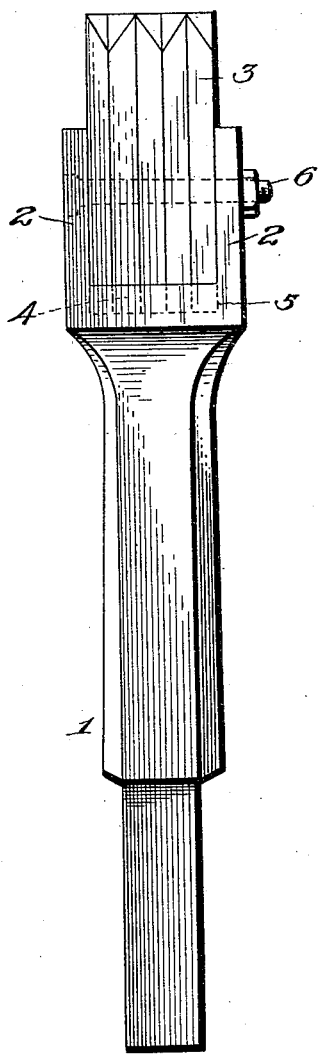
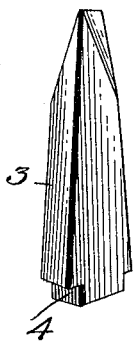
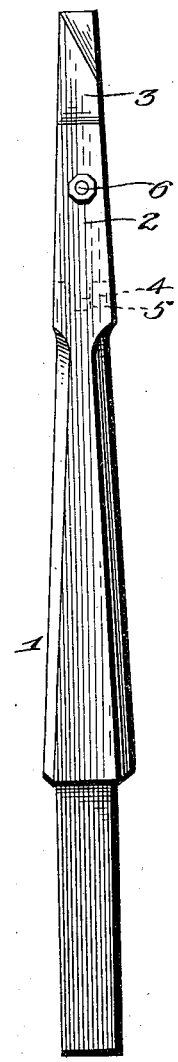
Inventor
John W. McClure

UNITED STATES PATENT OFFICE.

JOHN W. McCLURE, OF RICHMOND, INDIANA.

BUSH-CHISEL.

SPECIFICATION forming part of Letters Patent No. 703,950, dated July 1, 1902.

Application filed September 10, 1901. Serial No. 74,971. (No model.)

*To all whom it may concern:*

Be it known that I, JOHN W. MCCLURE, a citizen of the United States, residing at Richmond, in the county of Wayne and State of Indiana, have invented certain new and useful Improvements in Bush-Chisels; and I do declare the following to be a full, clear, and exact description of the invention, such as will enable others skilled in the art to which it appertains to make and use the same.

The invention relates to a bush-chisel.

The object of the invention is to provide a simple, durable, and inexpensive device of this character which shall be effective in action and by means of which chisel points or blades may be easily and quickly removed for sharpening, repair, or replacement with new ones.

With this and other objects in view the invention consists of certain novel features of construction, combination, and arrangement of parts, which will be hereinafter more fully described, and particularly pointed out in the appended claim.

In the accompanying drawings, Figure 1 is a front elevation of the chisel. Fig. 2 is a side elevation. Fig. 3 is a detail perspective view of one of the chisel-blades, and Fig. 4 is an end view of the several blades when assembled.

Referring to the drawings, 1 denotes the shank or handle of a tool, having parallel integral ears 2, between which are adapted to be placed the chisel-blades 3, the lower ends of which are provided with tenons 4, which are adapted to fit into a longitudinal groove or channel 5, formed in the end of the shank between the ears. These chisel-blades have their cutting edges preferably shaped as shown in Fig. 3, and when assembled the cutting-faces are arranged in zigzag order, as shown in Fig. 4, whereby a better working surface is produced. A bolt 6 extends through apertures in the ears and apertures 7 in the chisel-blades and is provided with a tightening-nut 8. If it be desired to remove the chisel-blades for the purpose of repair, sharpening, or replacing them with new ones when they become worn, all that is necessary is to loosen the nut and withdraw the through-bolt 6, which permits of any one or all of the blades being easily and quickly removed.

The bush-chisel in common use is employed only to make a finish after the rough has been taken off by another tool termed a "pean-hammer;" but by arranging the cutting-faces of the chisel-blades in zigzag order I produce a tool which does the work of both—that is, removes the rough and leaves a fine finish.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

The combination with the handle of a tool provided with integral ears and formed with a longitudinal groove or channel at its end, located between said ears, of tools having shanks, said tools having tenons and said tools located between the ears and seated with their tenons in said groove and having their cutting edges arranged in zigzag fashion, and a through-bolt for clamping the tools to said ears, substantially as set forth.

In testimony whereof I have hereunto set my hand in presence of two subscribing witnesses.

JOHN W. McCLURE.

Witnesses:
JOHN W. TINGLE,
HIRAM S. NELSON.